April 10, 1956  R. J. E. BUCKINGHAM  2,741,172
ROW CROP PLANT THINNER
Filed June 4, 1952  6 Sheets-Sheet 1
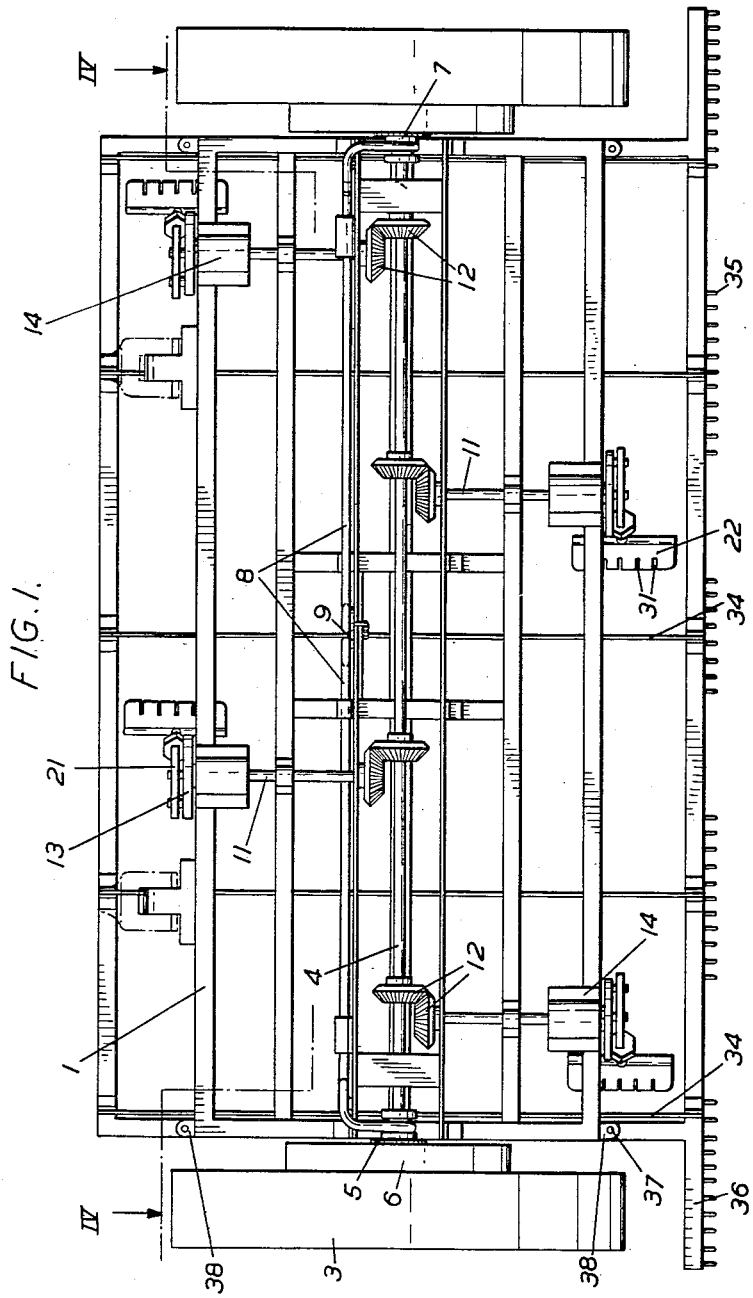
Inventor
Richard J. E. Buckingham
By
Attorney

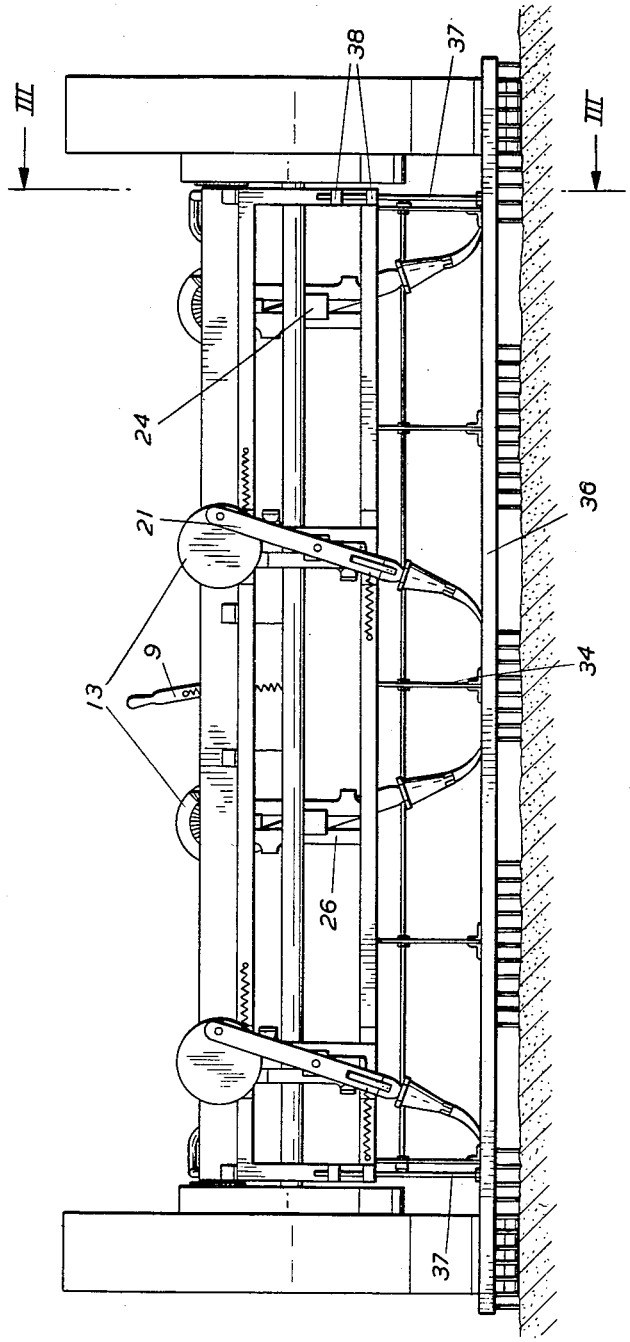

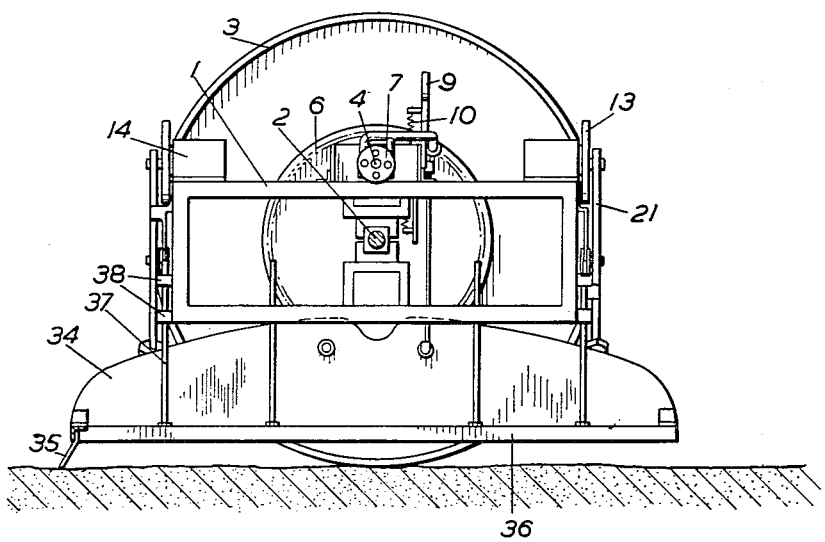

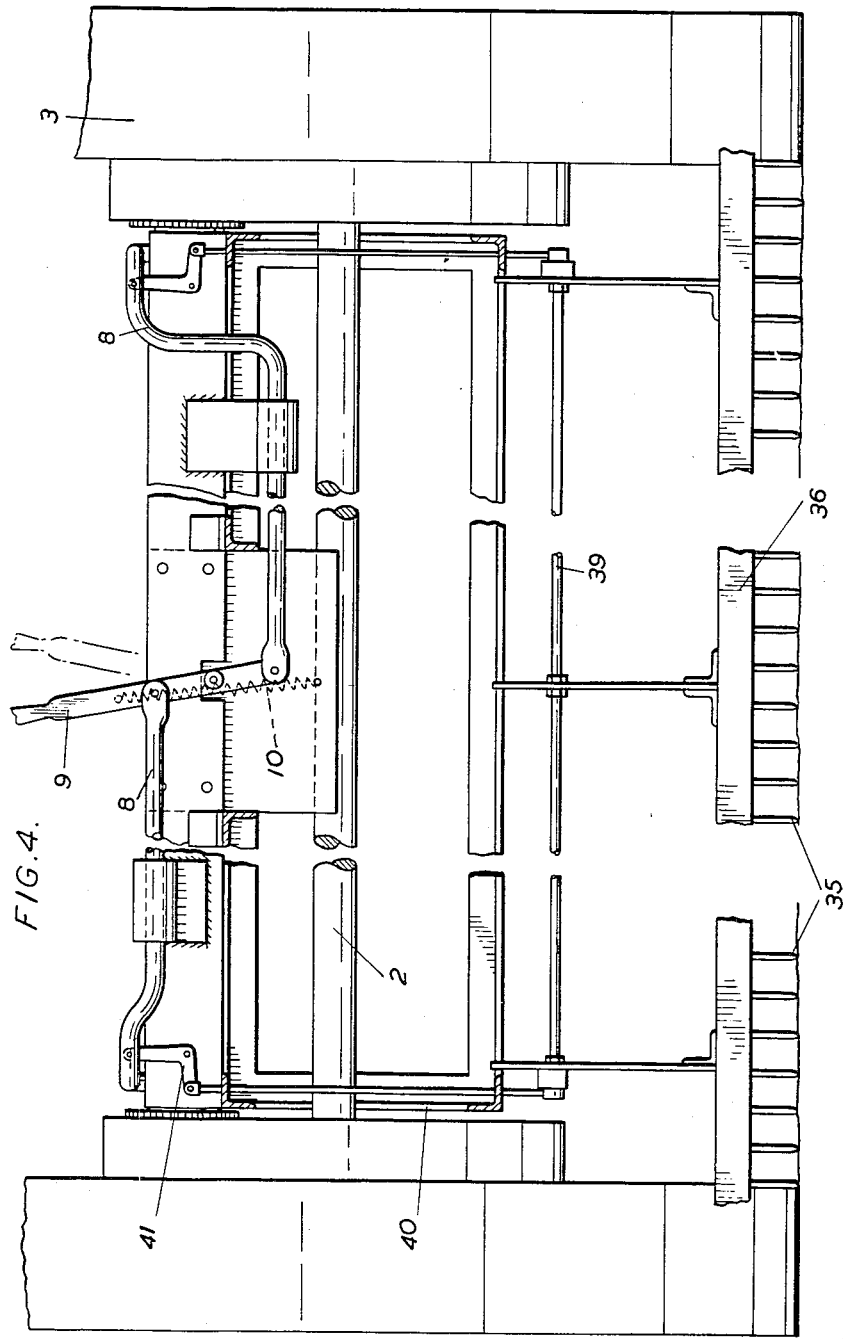

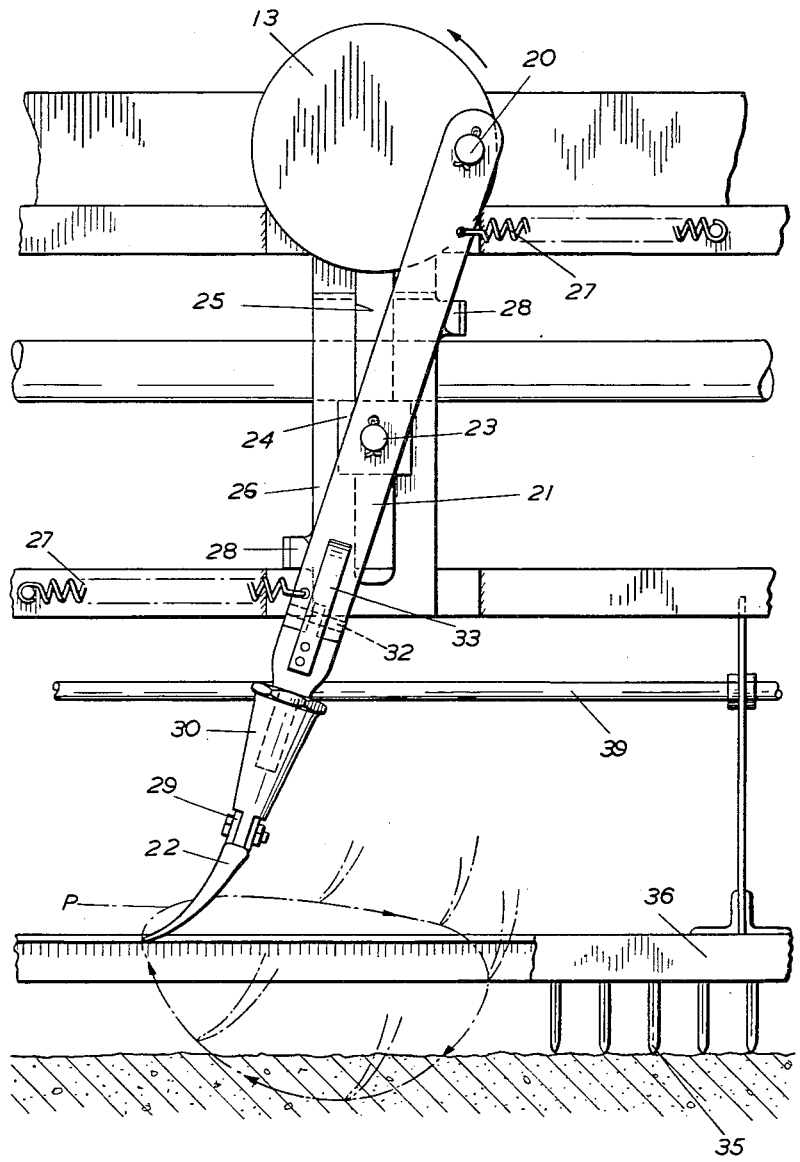

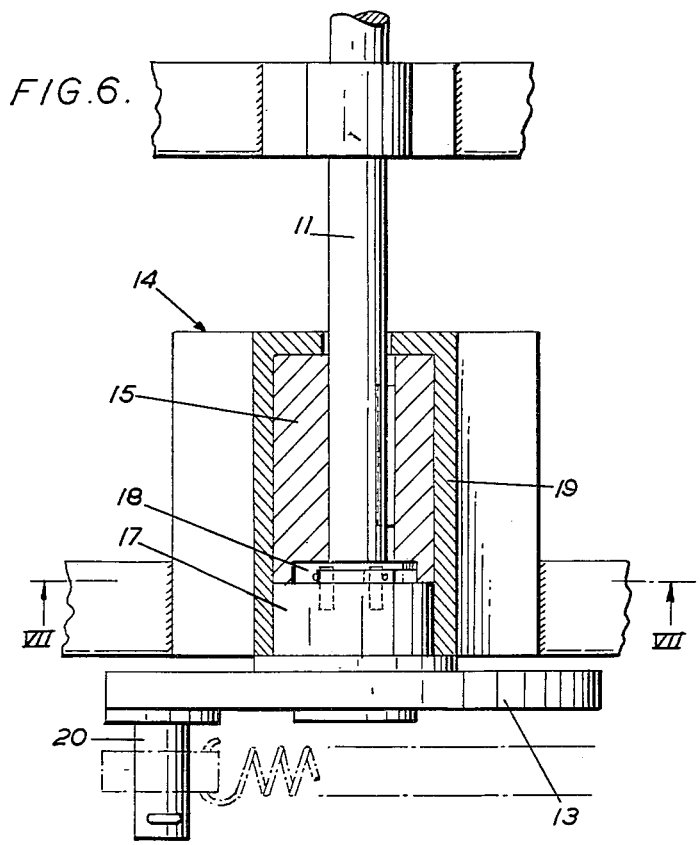
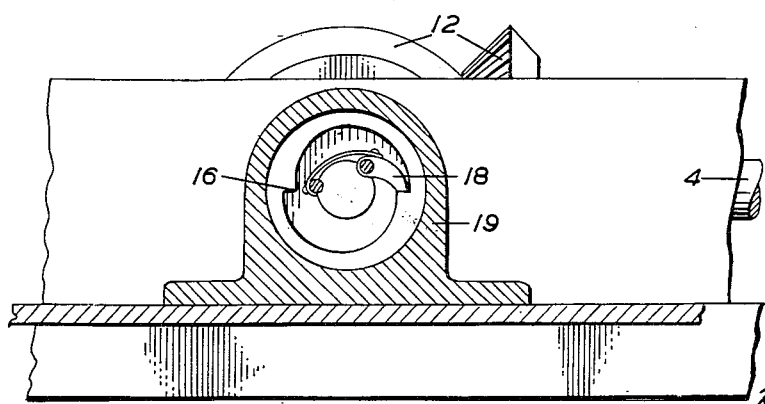

United States Patent Office 2,741,172
Patented Apr. 10, 1956

2,741,172
ROW CROP PLANT THINNER

Richard J. E. Buckingham, Chedburgh, Bury St. Edmunds, England

Application June 4, 1952, Serial No. 291,744

5 Claims. (Cl. 97—13)

In the cultivation of certain types of root crops, principally sugar beet and mangels, it is the usual practice to sow the seed in continuous rows and, after the young plants have appeared, to thin them out to the required degree, that is to leave single plants spaced approximately one foot apart. This removal of the surplus plantlings is normally effected in two operations, the first being commonly termed "blocking out" or "chopping out" and consisting of the removal of sufficient plants by the use of a hoe such as to leave small clusters of two or three plants at the required intervals and the second operation, performed a week or two later, being the further cutting out from each cluster to leave a single plant. Up to the present time these operations have been performed by hand and were therefore costly in both time and labour and the object of the present invention is to provide a simple but robust form of machine which when drawn along the rows of plantlings will cut out predetermined sections of the rows, the machine being particularly designed to effect the "blocking out" operation above mentioned.

According to the invention a machine for the purpose described comprises a rigid frame mounted on ground wheels, a hoe carried on the lower end of a supporting arm which is slidably and oscillatably mounted upon the frame for movement in a vertical plane extending transversely of the machine, spring means acting laterally upon said arm to rock or tilt the arm in one direction and a crank or equivalent mechanism for actuating said arm and which is driven from the ground wheels through a freewheel device or similar uni-directional clutch, the arrangement being such that over part of the travel of the crank the hoe is lifted and moved laterally above ground level and thereafter said hoe is caused to swing rapidly down and up in the reverse direction and in an arcuate movement through the ground under the action of the loading spring means. Thus during the first part of its movement the hoe is lifted over the plantings whilst on its rapid return movement, which is permitted by reason of the uni-directional clutch interposed in the drive to the crank mechanism, the hoe chops out from the row of plantlings a section corresponding to the width of the hoe blade.

The machine preferably embodies two or more hoeing mechanisms so that a number of rows of plantlings may be worked simultaneously, the machine being provided with suitable draught means to enable it to be towed by a horse or by a tractor or it may be attached to a tractor by means of a self lifting gear.

In order that the invention may be more fully understood reference will now be made to the accompanying drawings which show a preferred embodiment and wherein:

Fig. 1 is a plan view of the machine,

Fig. 2 is a rear elevation thereof,

Fig. 3 is a sectional end view taken on the line III—III of Fig. 2.

Fig. 4 is a sectional elevation taken on the line IV—IV of Fig. 1,

Fig. 5 is an enlarged view of a hoe and its associated actuating mechanism,

Fig. 6 is an enlarged sectional view of the unidirectional clutch mechanism, and Fig. 7 is a sectional view taken on the line VII—VII of Fig. 6, As shown, the machine comprises a rigid main frame 1 of rectangular box-like form and preferably fabricated from angle or similar section steel bars, said frame being supported upon an axle shaft 2 to which a pair of ground wheels 3 are attached. Supported on the upper side of the frame is a transverse rotary lay shaft 4 which carries loosely on its ends pinions 5 permanently meshing with internally toothed rings 6 fast on the ground wheels so that the pinions rotate in timed relation with the speed of travel of the machine. Each pinion 5 constitutes one member of a two-part dog clutch the other axially movable member 7 of which is keyed to the lay shaft, the members 7 being connected by rods 8 to a hand lever 9 mounted at the middle of the frame and under control of an over-centre spring 10 so that drive between the ground wheels and the lay shaft may be established and interrupted as and when desired.

At spaced intervals across the frame corresponding to the spacing of the rows of plantlings is a series of four auxiliary shafts 11 which are driven from the lay shaft through bevel gearing 12, two of said auxiliary shafts extending towards the front side of the frame and the other two towards the rear side thereof. Aligned with each auxiliary shaft 11 is a disc 13 which is coupled to said shaft by a uni-directional clutch indicated generally at 14 so that the disc may over-run the shaft when necessary. The uni-directional clutch may be of any suitable type but the preferred arrangement which is shown in detail in Figs. 6 and 7 comprises a sleeve 15 keyed to the shaft 11 and having a recessed end formed with internal ratchet teeth 16, and a stub shaft 17 on the disc 13 carrying on its end face a spring loaded pawl 18 which co-operates with said ratchet teeth, these components being located in a housing 19 which is secured to the frame and provides bearing surfaces for the sleeve 15 and stub shaft 17 and a complete enclosure of the mechanism. Each disc 13 carries a crank pin 20 to which is attached an arm 21 carrying a hoe 22 on its lower end, said arm being pivotally mounted intermediate its ends upon a pin 23 carried by a block 24 which is mounted for sliding movement in a vertical slot 25 formed in a guide plate 26 fixed to the frame. Extending between points on the arm 21 and fixed points of anchorage on the frame is a pair of strong tension springs 27 which urge the arm to the initial or rest position shown in the drawings and in this position the arm abuts a pair of rubber buffers or stops 28 which by cushioning the arm at the end of an operative stroke reduces noise and vibration during operation of the machine. The operation of the machine is as follows:

With the hoeing mechanism at rest each arm 21 is held in the inclined position shown by the action of the springs 27, the crank pin 20 being at one of the mid-horizontal positions on the disc 13 and the hoe 22 being in a raised position at one side of the row of plantlings to be worked. If now the clutches 5, 7 are engaged, the crank disc starts rotating, the crank pin moving up towards top dead centre as indicated by the arrow, Fig. 5, and then over towards the other mid-horizontal position. During this movement the hoe is swung from one side of the row of plantlings to the other but as the crank pin approaches top dead centre the arm 21 is also lifted, the pivot pin 23 riding in the slot 25, so that the hoe during said movement is lifted clear of the plantlings, following the upper part of the path of travel indicated at P in Fig. 5. This movement of the supporting arm tensions the springs 27 and shortly after the crank pin passes the second mid-horizontal position the springs come into action to swing the supporting arm rapidly about its pivot back to the starting position. This produces a downward and then upward arcuate movement of the hoe through the row of plantlings that is, over the lower part of path P, the hoe penetrating the ground to a predetermined depth which in the case of sugar beet will normally be in the region of two to three inches, so effectively cutting out the plantlings swept by the width of the hoe blade. The arm 21, during this rapid movement, takes with it the crank disc 13, the pawl 18 of the uni-directional clutch over-running the teeth on the sleeve 15, but the driving portion of the clutch continues to rotate at normal speed and as soon as the supporting arm 21 completes its sweeping movement and reaches the starting position the clutch picks up the drive again and another cycle of operations commences. Thus it will be seen that by appropriate choice of gearing and width of hoe blade the machine can be adapted to remove sections of any desired length from a row of plantlings and at any desired interval or spacing. In the application of the invention to sugar beet cultivation a hoe blade of approximately eleven inches wide is employed and the gearing is so devised as to produce one operative stroke of the hoe for each foot of forward travel of the machine. Thus in use the machine will leave small one inch clusters of plantlings at a foot apart in the row.

The prefered form or shape of the hoe will be seen by reference to Figs. 1 and 5. The blade is curved slightly as seen in end view and is carried at any angle such that minimum resistance is offered to its entry into the ground, said blade being bolted as shown at 29 to a footpiece 30 screw-threaded on to the lower end of arm 21. It has also been found in practice that a smoother action is achieved by providing notches or slots 31 in the leading edge of the blade.

To overcome any backward drag on the hoe blades when the latter strikes the ground and due to the forward motion of the machine, each arm 21 is hingedly joined to the hoe by a pivot pin 32 near its lower end so that the hoe may yield slightly relative to its actuating mechanism, the footpiece 30 being normally held rigid in its extended position by a blade spring 33. The depth of cut may be varied according to requirements by adjusting the footpiece 30 upon the lower end of arm 21 whilst the hoe blade may also be adjustable in width if desired, for example by the use of detachable strips or cutters applied to the side edges of the blade.

To prevent the hoed earth and uprooted plants being widely scattered a series of plate-like shields 34 are mounted at intervals across the underside of the main frame 1 whilst arranged at the rear of the machine is a series of earth spreading devices, which may be rake teeth 35 as shown or disc coulters, so disposed as to pass between the rows of plantings to level off the turned earth. The earth shields and the earth spreading devices are carried by a rectangular framelike structure 36 which is suspended on vertical rods 37, the rods being capable of sliding movement in sockets 38 attached to the main frame so that the shields and spreading devices can be lifted well clear of the ground for convenience when transporting the machine to and from a field of work. Any suitable means may be employed for raising and lowering the structure 36. In the drawings, this structure is shown connected by a cross bar 39 to vertical rods 40 whilst bell crank levers 41 connect the upper ends of these rods to the clutch actuating rods 8, the arrangement being such that operation of the handle 9 to engage the clutches 5, 7 simultaneously lowers the earth shields and spreaders and raises them again when disengaging said clutches. If desired, however, separate means may be provided for actuating the rods 40.

Finally, it may be mentioned that the mechanism is normally enclosed on its upper side by a housing or cowling through which the handle 9 extends but which has been omitted from the drawings for clarity.

Thus it will be seen that a machine constructed as above described will in use enable sugar beet and similar crops to be cultivated at a mere fraction of the labour costs previously entailed. Moreover, use of the machine permits more intensive cultivation of a field, that is more food per acre, in that the final spacing of the plants can be chosen such as to achieve ideal growing conditions and maximum yield and is not restricted by conditions which apply where "blocking out" is done manually.

I claim:

1. In a machine for blocking out plantlings, a rigid transportable frame having ground engaging wheels and carrying guide structure including a vertically extending slot, a rotary shaft on said frame extending transversely with respect to the direction of travel of the frame, said shaft incorporating a unidirectional clutch device imparting rotation to a part carrying a crank, arm structure carrying a ground engageable hoe at one end, said arm structure being connected to said crank at its opposite end so that the arm structure depends from the crank, means intermediate the ends of said arm structure and engaged in said vertical slot for guiding said arm structure for vertical oscillatory movement by said crank in a vertical plane, and spring means connected between said arm structure and frame, said spring means being operative to constantly urge said arm structure laterally into an inclined position with respect to said vertical slot when said arm reaches an over center position, whereby in the rotation of said crank said hoe is constrained to travel in lifted position laterally in one direction above the ground against the action of said spring means and is then caused to swing rapidly down and up in the opposite direction under the action of said spring means, said unidirectional clutching device being in an overrunning disengaged condition.

2. A machine as claimed in claim 1, said arm structure including a hinge joint connecting said hoe with the arm structure, and spring means operatively associated with said joint for normally maintaining said hoe in alignment with the arm structure.

3. A machine as claimed in claim 1 wherein a plurality of said hoe carrying arms are mounted in spaced relation across the frame, said ground engaging wheels carrying toothed rings, a hand-controlled clutch at each end of said rotary shaft for establishing driving connection between the rotary shaft and the said toothed rings, and a series of auxiliary drive shafts each driven from the rotary shaft through bevel gearing and each driving a hoe carrying arm through a unidirectional clutch.

4. A machine as claimed in claim 1, including plate-like earth shield means mounted beneath the frame and so disposed as to prevent scattering of earth and plants thrown up by the hoe.

5. A machine as claimed in claim 4, including hand actuated means for raising the earth shields clear of the ground when the machine is not in use.

References Cited in the file of this patent

UNITED STATES PATENTS

| | | |
|---|---|---|
| 958,153 | Morris et al. | May 17, 1910 |
| 965,888 | Gibson | Aug. 2, 1910 |
| 1,303,602 | Sera | May 13, 1919 |
| 2,043,076 | Smith | June 2, 1936 |

FOREIGN PATENTS

| | | |
|---|---|---|
| 909,661 | France | Jan. 4, 1946 |